Patented June 28, 1932

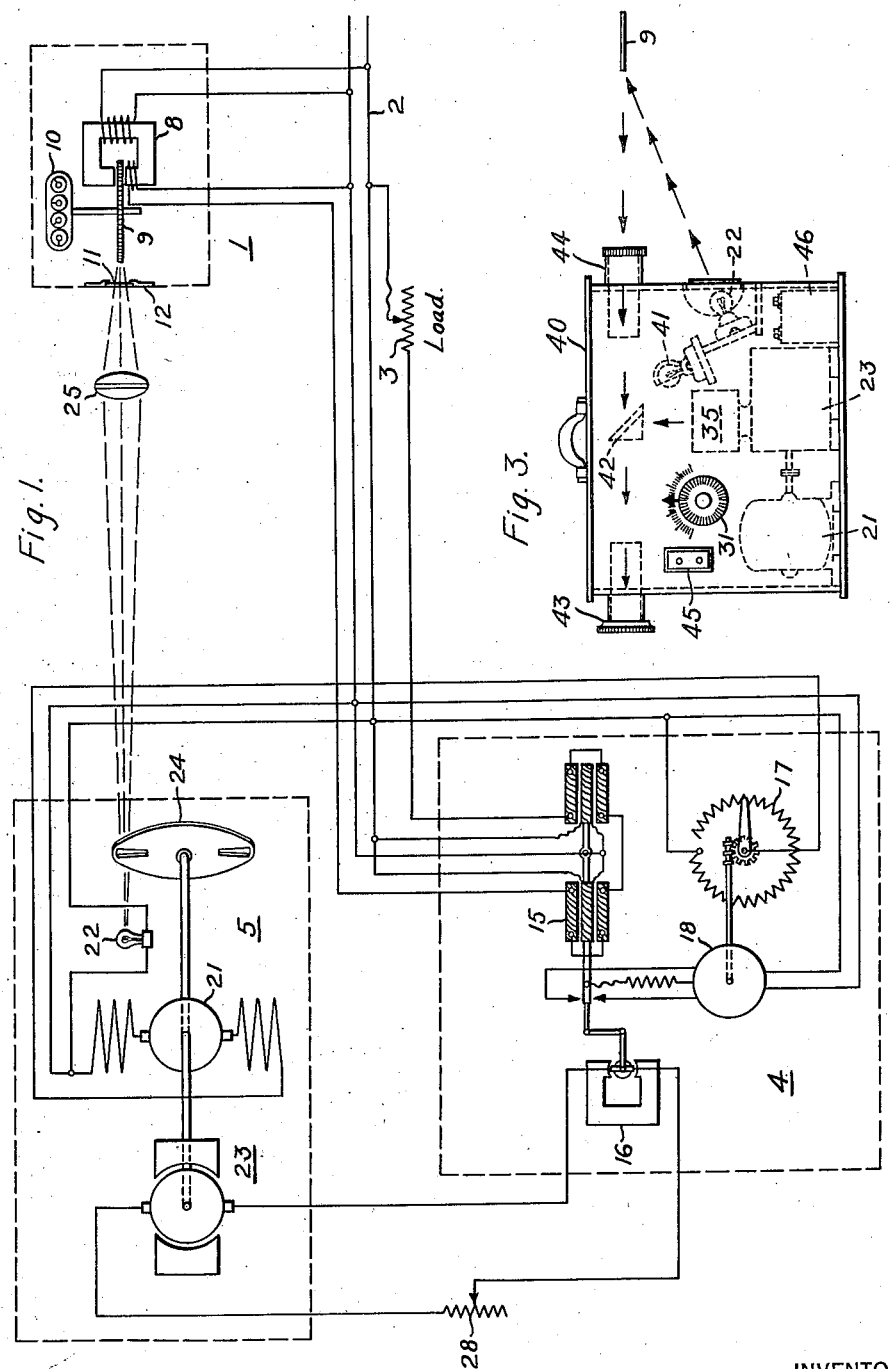

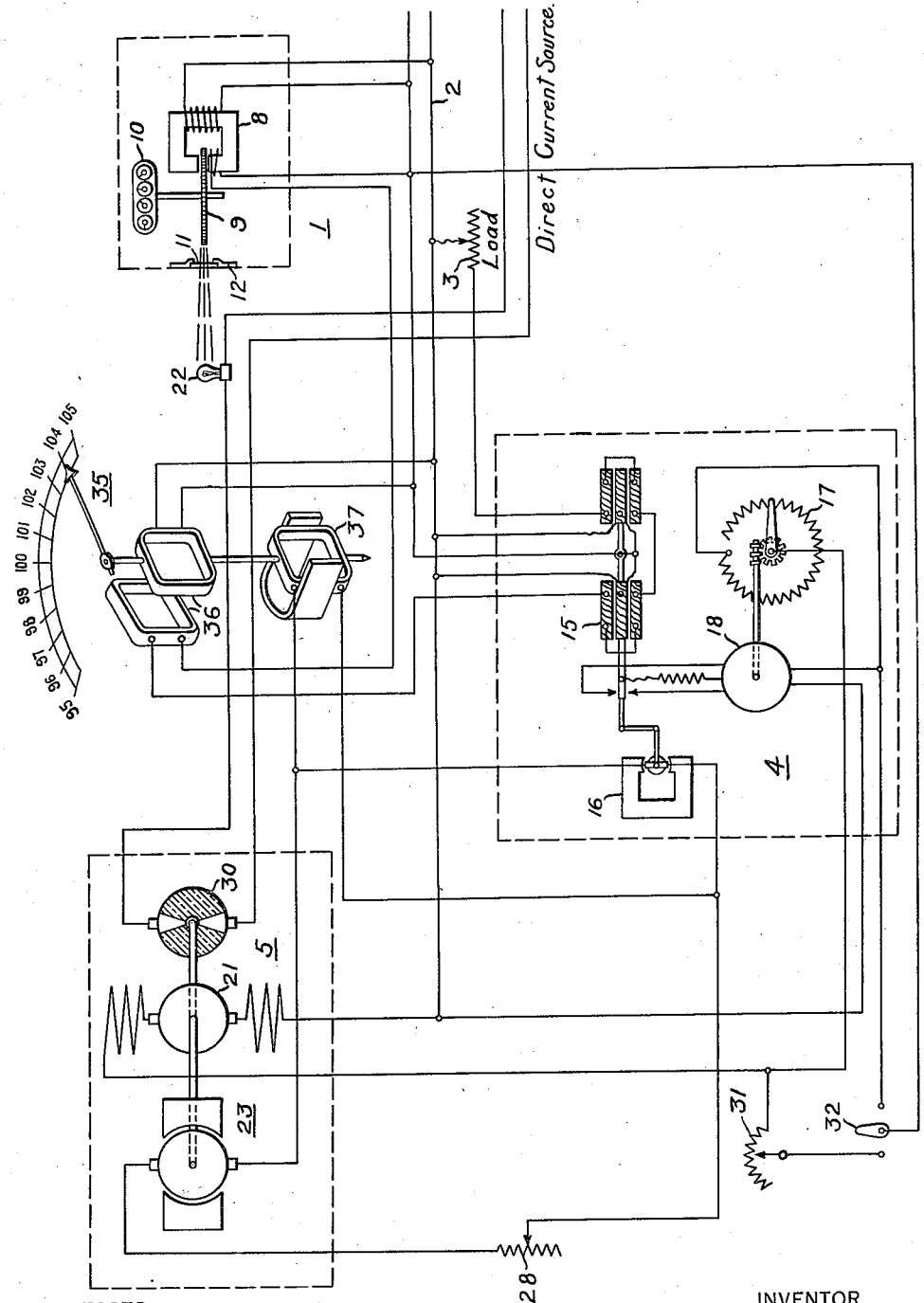

1,864,771

UNITED STATES PATENT OFFICE

HARRY P. SPARKES, OF PITTSBURGH, PENNSYLVANIA, ASSIGNOR TO WESTINGHOUSE ELECTRIC AND MANUFACTURING COMPANY, A CORPORATION OF PENNSYLVANIA

METHOD AND APPARATUS FOR CALIBRATING ELECTRICAL INSTRUMENTS

Application filed September 16, 1926. Serial No. 135,981.

My invention relates to methods of, and apparatus for, calibrating electrical instruments, and particularly for calibrating instruments of the integrating type, such as watthour meters.

An object of my invention is to improve the present methods of calibrating watthour meters which improved method is adapted for use either in the factory or after the meters have been installed on a customer's premises.

A further object of my invention is to expedite the calibration of integrating instruments by the use of stroboscopic means in connection with improved regulating and control devices.

A further object of my invention is to provide stroboscopic calibrating apparatus for enclosed watthour meter which may be employed without removing the cover or enclosing casing of the instrument being tested.

A still further object of my invention is to provide stroboscopic calibrating apparatus for integrating instruments having regulating means for compensating for variations in circuit conditions, such, for example, as fluctuations of the potential of the supply source.

Still another object of my invention is to provide calibrating apparatus embodying means for indicating directly the error in the instrument being calibrated. For example, the indicating means embodying my invention may be calibrated to show the percentage error in the registration of the instrument.

These and other advantages of my invention will appear more clearly from a consideration of the following detailed description of apparatus embodying the invention.

In accordance with my invention, the rotating element of an integrating instrument is provided with equally spaced marks or indicia for co-operation with a stroboscopic device. Preferably, the edge of the disc armature member is employed for this purpose, as this edge is visible through the cover of the instrument, and, consequently, the instrument may be calibrated without removing the cover. Lines may be painted on the edge of the disc, or the edge of the disc may be scored or ruled in a milling machine or ruling engine.

If lines are painted on the disc, the lines should preferably be in a color contrasting with the color of the armature disc, although any colors may be employed by the use of color filters in the optical system to be described.

The stroboscopic calibrating apparatus comprises a light source controlled in accordance with the correct speed of rotation of the integrating instrument in such a manner that the lines or indicia on the armature member will appear stationary at some predetermined speed. For example, a motor-driven commutator controlling a gas-filled, high-speed signalling lamp, or a motor-driven light shutter, interposed between the light source and the integrating instrument, may be employed. In order to compensate for variations in circuit conditions, such as variations in the potential of the supply circuits, suitable regulating means is employed between the circuit and the stroboscopic device.

In calibrating instruments in the factory, it is desirable to adjust the respective instruments to a standard before the instruments are sold. However, after the instruments have been installed in service, it may be desirable to determine the degree of accuracy of the instruments before correcting the adjustment thereof.

In accordance with a further feature of my invention, this result is accomplished by the provision of an indicating device which indicates the degree of accuracy of the instrument being tested when the speed of the stroboscopic device has been adjusted to correspond to the speed of the watthour meter. The indicating device preferably comprises a wattmeter element connected in series with the watthour meter and mechanically coupled to a voltmeter element associated with the stroboscopic device. The broader aspects of my invention are disclosed and claimed in my copending application No. 358,619, filed April 27, 1929.

In the accompanying drawings, Fig. 1 is a diagrammatic view of calibrating apparatus for a watthour meter embodying my invention;

Fig. 2 is a similar view of a modification of the apparatus shown in Fig. 1, and Fig. 3 is an assembly view of the apparatus disposed in a portable carrying-case so that it may be employed, for example, in calibrating instruments already installed in service.

In Fig. 1 is shown calibrating apparatus embodying my invention and adapted for use in the factory testing of a large number of instruments which must be calibrated properly before being sold.

Referring to Fig. 1, a watthour meter 1 is connected to a supply circuit 2, a load 3 being connected to the circuit 2 through the windings of the watthour meter 1 and the windings of a regulating device 4 associated therewith. Stroboscopic calibrating apparatus 5 is also associated with the watthour meter 1 and is controlled by the regulator 4.

The watthour meter 1 comprises an electromagnet 8, an armature member 9 controlled thereby and a register 10 driven by the armature member 9. The edge of the armature member 9 has equally spaced marks or indicia thereon, which are visible through a window 11 in the cover member 12 of the instrument.

The regulator 4 comprises a Kelvin-balance wattmeter 15 in series with the watthour meter 1, a D'Arsonval voltmeter 16 mechanically connected to the movable arm of the Kelvin-balance 15 and a variable resistor 17 controlled by a pilot motor 18 in accordance with the relative torques of the instruments 15 and 16.

The stroboscopic device 5 comprises a driving motor 21, a light source 22, a tachometer generator 23 and a light shutter 24, both disposed on the shaft of the motor 21, the shutter 24 being interposed between the light source 22 and the instrument 1 to be tested. A condensing lens 25 is shown in front of the instrument 1 to focus the light rays upon the instrument, but this condensing lens may usually be omitted if the intensity of the light source 22 is sufficient.

The driving motor 21 of the stroboscopic device 5 is connected, through the variable resistor 17 of the regulator, to the circuit 2. The terminals of the tachometer generator 23 are connected to the terminals of the voltmeter 16, a calibrating resistor 28 being provided in this circuit.

The armature member 9 of the watthour meter 1 rotates at a predetermined speed, depending upon the adjustment of the meter and the magnitude of the load 3. If the adjustment of the meter is correct, the speed corresponds to the speed of the stroboscopic device 5, so that the marks on the armature disc 9 of the watthour meter appear to an observer to remain stationary. This is the well-known stroboscopic effect, and it is believed that the operation will be clear without a detailed explanation of the phenomenon.

If the adjustment of the watthour meter 1 is incorrect, the armature member does not appear stationary and the instrument is adjusted until the desired speed of rotation is obtained. If a large number of equi-distant marks on the armature member 9 be employed, the instrument may be easily and quickly adjusted with a high degree of accuracy.

Ordinarily, variations in the potential of the supply circuit 2 are sufficient to disturb the testing operation when a special source of constant potential is not used, and, consequently, the regulator 4 is provided to compensate for these variations. If the voltage of the circuit should increase, the load 3 will consume more energy, and the instruments 1 and 15 will both have increased torque. If the increase in voltage of the supply circuit 2 does not increase the speed of the driving motor 21 at the same rate as the speed of the watthour meter 1, the Kelvin-balance wattmeter 15 overcomes the torque of a voltmeter 16 and varies the resistor 17 by means of the pilot motor 18 until the speed of the driving motor 21 reaches the desired value. Consequently, variations in the potential of the supply circuit will not affect the calibrating operation and it is unnecessary to employ a supply circuit of absolutely constant voltage, as has heretofore been necessary.

In Fig. 2 is shown a modification of the system shown in Fig. 1 in which a direct indication is obtained of the degree of accuracy of the watthour meter under test. For example, the watthour meter may be one that has been installed upon a customer's premises for a considerable period, and it may be desirable to check the accuracy before an attempt is made to correct the adjustment of the meter.

In this modification, the regulating device 4 and the stroboscopic apparatus 5 are substantially the same as in Fig. 1, except that the current to the light source 22 is rapidly interrupted by means of a commutator 30 driven by the motor 21. In this case, the light source 22 is preferably a lamp having an incandescent filament of such character that it is heated and cooled rapidly as the current therethrough varies.

This result may be obtained, for example, by filling the envelope of the lamp with hydrogen or other inert gas of high thermal conductivity. It will be apparent that this arrangement is equivalent to the light shutter shown in Fig. 1.

A manually adjustable resistor 31 is provided in the circuit of the driving motor 21, and a change-over switch 32 is also provided to permit the driving motor to be controlled either by the regulator resistor 17 or the lastmentioned resistor 31. In some cases, the regulating apparatus 4 may be omitted, and the regulation of the driving motor 21 accomplished solely by means of the adjustable resistor 31.

An indicating device 35 is so connected to the watthour meter 1 and to the tachometer 23 as to indicate directly the degree of accuracy of the watthour meter when the stroboscopic apparatus has been adjusted to correspond to the registration of the watthour meter.

The indicating device 35 comprises a wattmeter 36, of the electro-dynamic type, mechanically coupled to a voltmeter 37 of the D'Arsonval type. The wattmeter 36 is so connected in series with the watthour meter 1 that it will be energized in accordance with the magnitude of the load 3 connected to the watthour meter. The voltmeter 37 is so connected to the tachometer 23 that it is energized in accordance with the speed of rotation of the driving motor 21 of the stroboscopic apparatus.

The driving motor 21 is adjusted by means of the variable resistor 31 until the speed of the stroboscopic apparatus corresponds to the registration of the watthour meter 1. If the watthour meter 1 is in correct adjustment, the torque of the wattmeter 36 exactly balances the torque of the voltmeter 37, and the pointer of the indicating device 35 indicates the accuracy of the instrument under test to be 100%.

If the watthour meter has an error, the necessary adjustment of the stroboscopic apparatus 5 alters the speed of the tachometer 23, and the voltmeter 37 has a greater or less torque than that of the wattmeter 36. Consequently, the pointer of the indicating device 35 indicates the fact that the watthour meter 1 has a positive or a negative error. If desired, the scale of the indicating device 35 may be calibrated to indicate the percentage error, as indicated.

As shown in Fig. 3, the apparatus may be disposed in a portable carrying-case 40 to facilitate the testing of instruments installed on customer's premises. In this form, the automatic regulating apparatus 4 is preferably omitted, and the speed of the driving motor 21 of the stroboscopic apparatus is manually controlled by the resistor 31. The scale of the indicating device 35 may be illuminated by means of a lamp 41, and the optical system be so arranged that the observer may read the indication of the instrument 35 at the same time he is observing the stroboscopic effect on the disc armature member 9. This result is accomplished by the provision of a reflecting prism 42 interposed between the eye-piece 43 and the condensing lens 44 of the optical system. The reflecting prism 42 reflects the illuminated scale of the instrument 35 in the field of the eye-piece 43 without obstructing the light reflected from the armature member 9 through the condensing lens 44.

A switch 45 is provided for controlling the filaments of the lamps 22 and 41. The lamps may be lighted from a battery 46 disposed in the portable carrying-case, or from any other suitable source of current.

Other modifications and improvements of my invention will occur to those skilled in the art, and, consequently, I desire that the scope of my invention shall not be limited except as limitations may be imposed by the prior art and embodied in the appended claims.

I claim as my invention:

1. Calibrating apparatus for electrical instruments comprising stroboscopic means connected to the circuit to which the instrument is connected, and means for regulating said stroboscopic means for errors incident to variations in an electrical quantity of said circuit.

2. Calibrating apparatus for electrical instruments comprising stroboscopic means connected to the circuit to which the instrument is connected, and means for regulating said stroboscopic means for errors incident to variations in the voltage of said circuit.

3. Calibrating apparatus for electrical instruments comprising stroboscopic means including a motor connected to the circuit to which the instrument is connected and a light source controlled in accordance with the speed of said motor, speed-controlling means for said motor, and means automatically operating said speed-controlling means in accordance with variations in an electrical quantity of the circuit.

4. In combination, an integrating meter having a rotating armature member and a cover through which the rotation of the armature member may be observed, the visible portion of the armature member bearing equi-distant indicia, a source of current, a load connected to said source through said meter, stroboscopic means for checking the registration of the meter, and means for compensating the stroboscopic means for variations in the voltage of said source.

5. The method of calibrating electrical instruments of the integrating type, which consists in stroboscopically comparing the speed of rotation of the integrating instrument with the rapidity of movement of a second device, compensating the movement of the latter in accordance with variations in an electrical quantity that affects the speed of rotation of the instrument being calibrated, and adjusting the speed of rotation of said integrating instrument to coincide with the speed of said second device.

6. In combination, an instrument having a rotating disc and a cover through which the movement of the edge of said disc may be observed, the peripheral edge of said disc having a milled surface, a source of current, a load connected to said source through said instrument, stroboscopic means coacting with the milled edge of said disc for checking the registration of said instrument, and means automatically adjusting said stroboscopic means for errors incident to changes in an electrical characteristic of said source.

7. In combination, an integrating meter having a rotating armature member, said armature member bearing equi-distant indicia upon the peripheral edge thereof, a source of current, a load connected to said source through said meter, stroboscopic means for checking the registration of the meter, comprising a source of light, means for directing a ray of light from said source upon the peripheral edge of said armature member, a motor having a shaft, a shutter disc secured to said shaft and adapted to periodically interrupt said ray of light, and means, comprising a generator coupled to said motor shaft, for compensating the stroboscopic means for variations in the voltage of said source of current.

In testimony whereof, I have hereunto subscribed my name this 13th day of September, 1926.

HARRY P. SPARKES.